US 8,488,551 B2

(12) United States Patent
Pelletier et al.

(10) Patent No.: US 8,488,551 B2
(45) Date of Patent: Jul. 16, 2013

(54) METHOD AND ARRANGEMENT IN A TELECOMMUNICATION SYSTEM

(75) Inventors: Ghyslain Pelletier, Boden (SE); Magnus Lindström, Spånga (SE); Janne Peisa, Espoo (FI); Henrik Enbuske, Stockholm (SE); Eva Englund, Linköping (SE); Michael Meyer, Aachen (DE); Henning Wiemann, Aachen (DE); Christian Skärby, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 360 days.

(21) Appl. No.: 12/865,605

(22) PCT Filed: Dec. 16, 2008

(86) PCT No.: PCT/SE2008/051467
§ 371 (c)(1),
(2), (4) Date: Jul. 30, 2010

(87) PCT Pub. No.: WO2009/096847
PCT Pub. Date: Aug. 6, 2009

(65) Prior Publication Data
US 2010/0322098 A1 Dec. 23, 2010

Related U.S. Application Data

(60) Provisional application No. 61/024,731, filed on Jan. 30, 2008.

(51) Int. Cl.
*H04W 4/00* (2009.01)

(52) U.S. Cl.
USPC ............ 370/330; 370/329; 370/341; 710/56; 710/53; 710/54

(58) Field of Classification Search
USPC ................. 370/329, 330, 331, 332, 333, 334, 370/335, 336, 337, 338, 339, 340, 341; 710/52, 710/53, 54, 55, 56
See application file for complete search history.

(56) References Cited

U.S. PATENT DOCUMENTS

| 7,869,461 | B2 * | 1/2011 | Lohr et al. | 370/469 |
| 2005/0259662 | A1 * | 11/2005 | Kim et al. | 370/395.4 |
| 2009/0113086 | A1 * | 4/2009 | Wu et al. | 710/56 |

OTHER PUBLICATIONS

3GPP NOKIA. Buffer Reporting for E-UTRAN. R2-060829. 3GPP TSG-RAN WG2 Meeting #52. Athens, Greece. Mar. 27-31, 2005.

* cited by examiner

*Primary Examiner* — Dady Chery (57) ABSTRACT

A method for sending buffer status information includes checking if a quality of service (QoS) parameter is defined for a first logical channel and at least one condition of the set of predetermined conditions associated with a logical channel group is fulfilled. If the QoS parameter is defined and at least one condition of the set is fulfilled, the method includes setting a number of bits in a media access control header according to a first semantic. The bits carry buffer status information, and the first semantic—is based on the QoS parameter of the first logical channel. Otherwise, the method includes setting the number of bits carrying the buffer status information according to a second semantic that is based on an amount of data available for transmission across the logical channel group.

24 Claims, 7 Drawing Sheets

| Buffer Size | Code Point |
|---|---|
| 0 | 00 |
| ≤2*Transport Block | 01 |
| ≤8*Transport Block | 10 |
| >8*Transport Block | 11 |

Fig 3a

| Reported Code Point | Estimated Buffer Size |
|---|---|
| 00 | 0 |
| 01 | 0.5*Transport Block |
| 10 | 2*Transport Block |
| 11 | 8*Transport Block |

METHOD AND ARRANGEMENT IN A TELECOMMUNICATION SYSTEM

This application claims the benefit of U.S. Provisional Application Ser. No. 61/024,731, filed Jan. 30, 2008, the disclosure of which is fully incorporated herein by reference.

FIELD OF THE INVENTION

The present invention relates to methods and arrangements in a telecommunication system, in particular to transmission of uplink buffer status information.

BACKGROUND

UTRAN (Universal terrestrial radio access network) is a term that identifies the radio access network of a UMTS (Universal Mobile Telecommunications System), wherein the UTRAN consists of Radio Network Controllers (RNCs) and NodeBs i.e. radio base stations. The NodeBs communicate wirelessly with mobile user equipments and the RNCs control the NodeBs. The RNCs are further connected to the Core Network (CN). Evolved UTRAN (E-UTRAN) is an evolution of the UTRAN towards a high-data rate, low-latency and packet-optimised radio access network. Further the E-UTRAN does only consist of eNodeBs (evolved NodeBs), and the eNodeBs are interconnected and further connected to the Evolved Packet Core network (EPC). E-UTRAN is also being referred to as Long Term Evolution (LTE) and is standardized within the $3^{rd}$ Generation Partnership Project (3GPP).

In E-UTRAN, the uplink MAC (Media Access Control) scheduler resides in the eNodeB and assigns transmission resources, i.e. resource blocks, to user equipments associated with the eNodeB. Furthermore, the MAC scheduler selects the Transport Format (TF) to be used by the user equipment. Although the MAC scheduler controls the payload of a scheduled user equipment, the user equipment is responsible for selecting from which radio bearer the data is taken. Thus, the user equipment has an uplink rate control function which manages the sharing of uplink resources between radio bearers. RRC (Radio Resource Control) controls the uplink rate control function by giving each bearer a priority and a prioritized bit rate (PBR). The user equipment performs the radio-bearer multiplexing by serving the radio bearers in priority order up to their configured PBR. Remaining resources assigned by a grant, after fulfilling the PBR, are given to the radio bearers in priority order. In case the PBRs are all set to zero, the first step is skipped and the radio bearers are served in strict priority order i.e. the user equipment maximises the transmission of higher priority data.

In order to assign transmission resources and select the TF the MAC scheduler needs information about the current buffer state of the user equipment, i.e. if and how much data the user equipment buffers in its priority queues. The MAC scheduler may also need further information such as the available power headroom or the transmit power in order to estimate the uplink gain and to select a suitable TF for the user equipment. Very precise and up-to-date scheduling information allows accurate scheduling decisions. However, providing this information from the user equipment towards the eNodeB comes at a certain cost which must be compared to the gain it offers.

It is likely that any buffer information received in the MAC scheduler will be outdated when it is to be used in the scheduling decision. New data may have arrived in the user equipment for a radio bearer (RB) with higher priority than current buffered data, or data may have been dropped from the buffer of the user equipment due to delay constraints. However, without any additional information the MAC scheduler has no indication if the previously scheduled grant was enough or if a large amount of data is still left in the buffer of the user equipment. A too large grant results in padding, which may reduce the system capacity, whereas a too small grant causes extra delay. A situation wherein this balance needs to be considered is high load situations close to the capacity limit. In this situation frequent uplink signalling of buffer occupancy will consume uplink capacity. Therefore, the frequency of signalling has to be weighted to the need of carefully scheduling each user equipment and implicitly each RB appropriately.

3GPP has specified a framework 3GPP TS 36.321 "Medium Access Control (MAC) protocol specification" for buffer status reporting. Buffer status reporting is used by the user equipment to report to the eNodeB the amount of data available for transmission that is stored in its buffers. The MAC scheduler uses these reports to allocate resources to the user equipment, and to prioritize resource allocation between different user equipments. Buffer Status Report (BSR) and Scheduling Request (SR) are triggered when uplink data arrives in the user equipment transmission buffer and the data belongs to a radio bearer group, i.e. a logical channel group, with higher priority than those for which data already existed in the buffer of the user equipment. With this type of triggering, the MAC scheduler can quickly be made aware when data with higher priority is available for transmission, without excessive reporting. It has also been agreed to introduce a periodic timer-based trigger BSR per user equipment to handle reporting for a continuous flow. However, the periodic BSR does not trigger BSR.

Figure 1A:
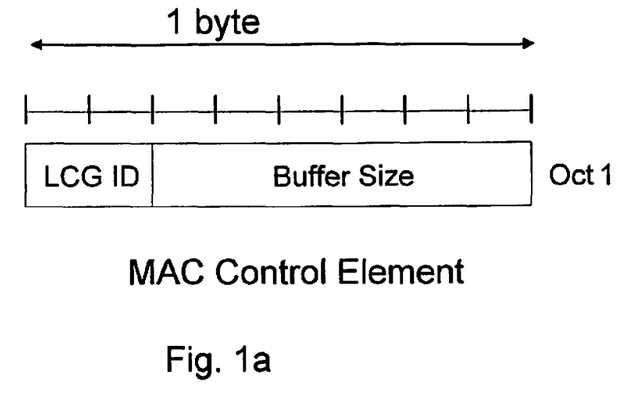
FIG. 1a illustrates a short BSR format and FIG. 1b illustrates a long BSR format according to prior art.
Figure 1B:
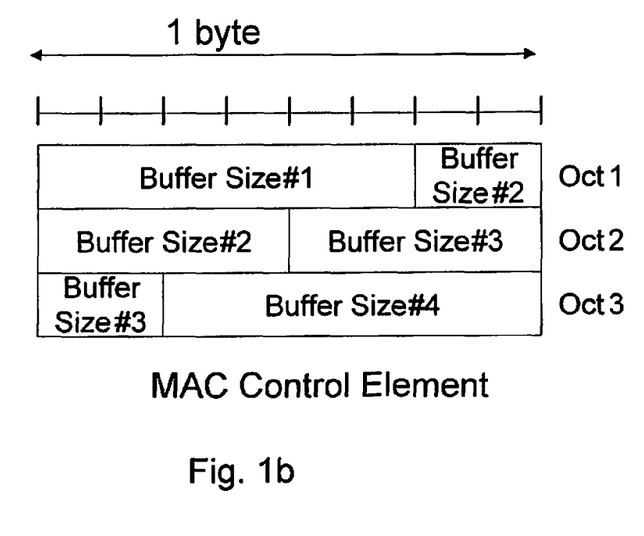

The BSR is defined as MAC Control Elements as pictured in FIG. 1 in LTE. The BSR Control Element consists of either a short BSR format, i.e. one LCG ID (Logical Channel Group Identity) field and one corresponding Buffer Size (BS) field shown in FIG. 1a or a long BSR format, i.e. four Buffer Size fields, corresponding to LCG IDs #1 through #4 as shown in FIG. 1b. The LCG ID field identifies the group of logical channel(s) for which buffer status is being reported. The BS field identifies the total amount of data available across all logical channels of a logical channel group after the MAC PDU has been built.

Figure 2:
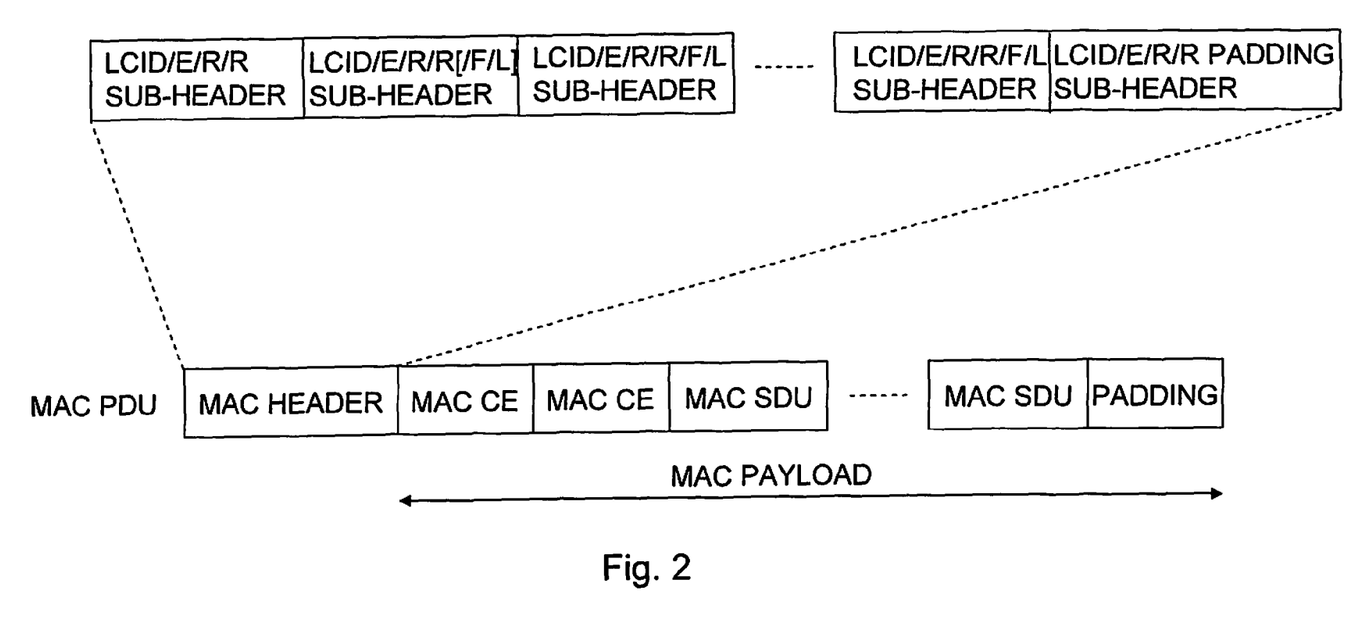
FIG. 2 illustrates MAC PDU consisting of a MAC header, MAC Control Elements, MAC SDUs, and padding according to prior art.

FIG. 2 illustrates a MAC PDU (Protocol Data Unit) consisting of a MAC header, MAC Control Elements, MAC SDUs (Service Data Units), and padding. A MAC PDU consists of a MAC header, zero or more MAC SDU, zero or more MAC Control Elements, and optionally padding. Both the MAC header and the MAC SDUs are of variable sizes. A MAC PDU header consists of one or more MAC PDU sub-headers; each sub-header corresponding to either a MAC SDU, a MAC Control Element or padding.

MAC PDU sub-headers have the same relative position order as the corresponding MAC SDUs, MAC Control Elements and padding have in the MAC PDU. MAC Control Elements are always placed before any MAC SDU. A maximum of one MAC PDU can be transmitted per Transport Block (TB) per user equipment. Depending on the physical layer category, one or two Transport Blocks can be transmitted per transport time interval (TTI) per user equipment.

The BSR framework previously described is sensitive to error cases due to HARQ (Hybrid Automatic Repeat-Query) failures e.g. NACK to ACK errors. These error cases can be recovered with the periodic timer-based trigger, but only to some extent and only when the user equipment gets a grant. Thus, detailed BSR sent in MAC CE is sensitive to HARQ errors and failures.

The BSR sent in MAC CE reports the amount of data in the buffers for one (short format) or four (long format) groups of logical channels, i.e. for one LCG or all four LCGs, respectively. The short BSR format is 1 byte, and the long format is 3 bytes as shown in FIGS. 1a and 1b. Assuming that the MAC header requires only a LCID and an E field, and that the L field can be omitted because the BSR CE has a fixed length, these 6 bits lead to one additional byte in the MAC header and thus the total overhead for each MAC PDU that carries a BSR is 2 bytes or 4 bytes, respectively.

The BSR framework requires a careful tuning of the triggering parameters to avoid excessive overhead. In the case where the UE transmission buffers are continuously filled with data, the scheduler typically needs frequent BSRs. For continuous flows, the timer-based approach will ensure that BSRs will be sent periodically. Parameter tuning depends on the characteristics of the traffic, which are difficult to predict. The frequency of the BSR will typically be configured for the worst-case traffic behaviour. However, when a detailed BSR is transmitted frequently, the number of bits of overhead is costly.

The eNodeB can configure semi-persistent resources for a user equipment, e.g. when a radio bearer carrying a VoIP service is setup. A semi-persistent resource assignment is valid for as long as more data is sent within a predetermined time period of last sent data and expires if no data is sent within the predetermined time period The resources are typically configured to match the bit rate of the service and the radio characteristics, taking into account the header compression if header compression is configured. The following events trigger a BSR in the above scenario:

RTCP (Real-Time Transport Control Protocol) arrives in the user equipment transmission buffer i.e. new data with the same or lower priority;

Header compression does not produce the smallest header size.

If the user equipment only has semi-persistent resources allocated at the time the event occurs, the user equipment would then send the regular BSR using the semi-persistent resource together with some of the data, e.g. a segment of a speech frame. The eNodeB can then allocate additional dynamic resources for the remainder of the data in the buffers of the user equipment. It could be desirable to avoid this overhead and to have the possibility to not send the BSR. A low-cost small buffer status report that indicates that the user equipment has more data to send simplifies semi-persistent scheduling. It is useful for the eNodeB to have as accurate buffer status as possible, to prioritize resource allocations between user equipments, and to decide how much resources to allocate when scheduling a user equipment.

Buffer Status Reporting may represent quite a large number of bits. If BSR is transmitted frequently, this could represent a considerable overhead. Many applications, e.g. TCP, continuously increase and decrease their congestion window e.g. when experiencing a packet drop. The buffer status is continuously changing and a rough buffer indication that is frequently updated is more useful than a detailed BSR.

SUMMARY

The object of the present invention is to provide an improved buffer status reporting.

Hence, the object is achieved according to the present invention by complementing the buffer status reporting with bits in the MAC header carrying buffer status information that are interpreted according to a first semantic or a second semantic.

In accordance with a first accept of the present invention a method in a user equipment for sending buffer status information associated with a first logical channel group comprising at least one logical channel in a transmission from a user equipment to a network node in a mobile telecommunications network is provided. In the method it is checked if at least a QoS parameter is defined for the at least first logical channel and at least one of a set of predetermined conditions is fulfilled. If at least a QoS parameter is defined for the at least first logical channel and at least one condition of the set of predetermined conditions is fulfilled the buffer status information associated with the first logical channel group is set according to a first semantic, if not, the buffer status information associated with the first logical channel group according is set according to a second semantic. The first semantic is based on at least one QoS parameter of the at least first logical channel and the second semantic is based on an amount of data available for transmission across at least the first logical channel group in the user equipment.

In accordance with a second aspect of the present invention a method in a base station for receiving buffer status information associated with a first logical channel group, comprising at least one logical channel, in a transmission from a user equipment in a mobile telecommunications network is provided. In the method it is checked if at least a QoS parameter is defined for the at least first logical channel and at least one of a set of predetermined conditions is fulfilled. If at least a QoS parameter is defined for the at least first logical channel and at least one condition of the set of predetermined conditions is fulfilled the buffer status information associated with the first logical channel group is interpreted according to a first semantic, if not, the buffer status information associated with the first logical channel group according is interpreted according to a second semantic. The first semantic is based on at least one QoS parameter of the at least first logical channel and the second semantic is based on an amount of data available for transmission across at least the first logical channel group in the user equipment.

In accordance with a third aspect of the present invention an arrangement in a user equipment for sending buffer status information associated with a first logical channel group comprising at least one logical channel in a transmission to a network node in a mobile telecommunications network is provided. The arrangement comprises a unit adapted for checking if at least a QoS parameter is defined for the at least first logical channel and at least one of a set of predetermined conditions is fulfilled. It further comprises a unit adapted for setting the buffer status information associated with the first logical channel group according to a first semantic, which is based on at least one QoS parameter of the at least first logical channel if at least a QoS parameter is defined for the at least first logical channel and at least one condition of the set of predetermined conditions is fulfilled. In addition, the arrangement comprises a unit adapted for setting the buffer status information associated with the first logical channel group according to a second semantic, which is based on an amount of data available for transmission across at least the first logical channel group in the user equipment.

In accordance with a fourth aspect of the present invention an arrangement in a base station for receiving buffer status information associated with a first logical channel group comprising at least one logical channel in a transmission from a user equipment in a mobile telecommunications network is provided. The arrangement comprises a unit adapted for checking if at least a QoS parameter is defined for the at least first logical channel and at least one of a set of predetermined conditions is fulfilled. It further comprises a unit adapted for interpreting the buffer status information associated with the first logical channel group according to a first semantic, which is based on at least one QoS parameter of the at least first logical channel if at least a QoS parameter is defined for the at least first logical channel and at least one condition of the set of predetermined conditions is fulfilled. In addition, the arrangement comprises a unit adapted for interpreting the buffer status information associated with the first logical channel group according to a second semantic, which is based on an amount of data available for transmission across at least the first logical channel group in the user equipment.

An advantage with embodiments of the present invention is that it provides a more accurate buffer reporting per user equipment and per radio bearer.

Another advantage with embodiments of the present invention is that the grants are more accurate and transmitted with less signaling.

Yet another advantage with embodiments of the present invention is that less padding and less overhead are needed in transmissions than when using BSRs.

Yet another advantage with embodiments of the present invention is that the buffer status reporting is more resilient to error cases.

Yet an advantage of embodiments of the present invention is that the eNodeB have the possibility to either perform scheduling based on optimal usage of radio resources with more accurate knowledge of amount of data in the buffers of the user equipment or perform scheduling based on a more strict enforcement of priorities between logical connections based on QoS, which ensures that priorities are respected. The former possibility is useful in order to allocate grants of the correct size, and thus avoid padding and/or grants of a too small size, which increases the number of grants needed to be signaled.

BRIEF DESCRIPTION OF THE DRAWINGS

For a better understanding, reference is made to the following drawings and preferred embodiments of the invention.

DETAILED DESCRIPTION

In the following description, for purposes of explanation and not limitation, specific details are set forth, such as particular sequences of steps, signaling protocols and device configurations in order to provide a thorough understanding of the present invention. It will be apparent to one skilled in the art that the present invention may be practiced in other embodiments that depart from these specific details.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

As stated above it is desired to provide improved buffer status reports by using some bits in the MAC header. The reserved bits R, can be used to transmit uplink user equipment buffer status information. Such bits in the MAC header dedicated to buffer status reports are also often referred to as happy bits. The happy bits are utilized to improve the reliability of the buffer status reporting (BSR) and to decrease overhead of the buffer status reporting. Happy bits could consist of one or two bits in the MAC header.

In the embodiments of the present invention the buffer status reports are complemented with happy bits carrying buffer status information which are interpreted according to a first semantic or a second semantic.

Hence, the happy bits could be interpreted according to two different semantics i.e. QoS-based semantic and BS-based semantic. The two semantics include the use of 1 or 2 bits in-band with the transmission itself, e.g. in the MAC header of the MAC PDU.

The term QoS-based (Quality of Service) semantic will in this specification be used to refer to the semantic of the happy bits i.e. the two bits of the small buffer status report when they are set according to the following criteria:

(a) The first happy bit is set to 1 if a PBR of a corresponding logical channel is exceeded and 0 otherwise;

(b) The second happy bit is set to 1 if $B_{out}>0$ and 0 otherwise, where $B_{out}$ is the amount of buffered data of the logical channels not included in the current uplink transport block (TB).

For logical channels with no configured PBR, it is considered that the PBR is fulfilled always i.e. the first happy bit is set to 1.

In case a token bucket approach is used to determine whether the PBR is met or not, the PBR is considered exceeded when data is added to the uplink TB beyond the point where the bucket became empty.

The QoS-based semantic is based on the way data from different logical channels with configured PBR is filled into the TB. The MAC scheduler derives information on the buffer status of the corresponding logical channel, as well as of other logical channels with configured PBR. For example, if the first happy bit of the first transmitted logical channel indicates that the PBR requirement of the logical channel is exceeded i.e. first happy bit is set to 1, it implicitly means that the PBR requirements of all lower priority logical channels with configured PBR respectively, are fulfilled. Furthermore, if the first happy bit of the second transmitted logical channel with configured PBR indicates that the PBR requirement is exceeded; it implicitly means that the first transmitted logical channel configured with PBR did not have any more data to transmit. With the second happy bit, the MAC scheduler can also derive information on the buffer status of logical channels without configured PBR of priority lower than the transmitted logical channels.

As an alternative a single happy bit may be used for BSR, wherein the single happy bit could be set according to the following criteria:
(a) If the corresponding logical channel is not the last one represented in the MAC PDU, then the happy bit is set to 1 if the PBR is exceeded and 0 otherwise;
(b) If the corresponding logical channel is the last one represented in the MAC PDU, then the happy bit is set to 1 if $B_{out}>0$ and 0 otherwise. Obviously, this also covers the case where there is only one logical channel represented in the MAC PDU.

It should be mentioned that the QoS-based semantic may be based on a packet delay bound (PDB) parameter instead of a PBR parameter.

Figure 3A:
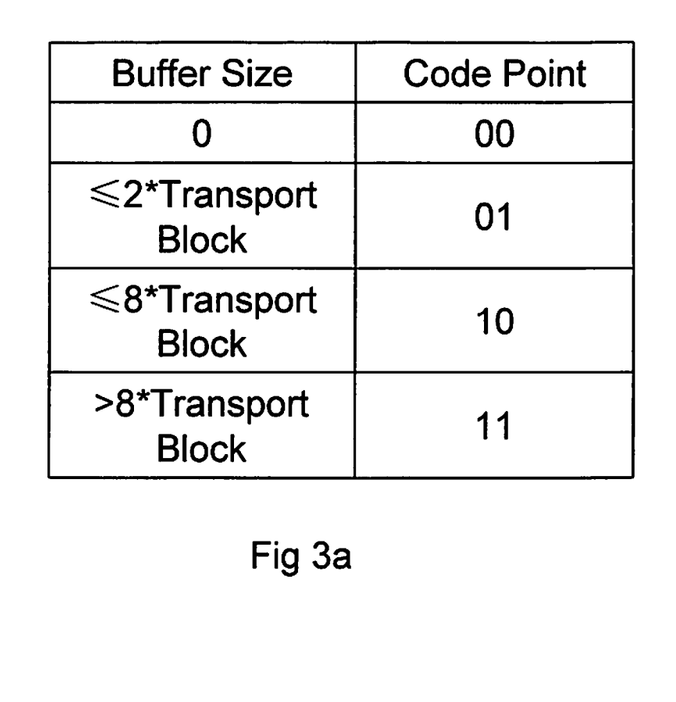
FIG. 3a illustrates the mapping table referred to by the Buffer Size-based semantic and FIG. 3b shows table of the estimated buffer size corresponding to the reported code points according to prior art.

The term Buffer Size-based (BS) semantic will be used to refer to the semantic of the happy bits when they are set according to a mapping table as shown in FIG. 3a. One code-point in the mapping table indicates an empty buffer. The remaining three values in the mapping table indicate an amount of data in the buffer in relation to the current TB size as shown in FIG. 3a. If the happy bits are either in the last or in the only sub-header of the MAC PDU, the value of the bits indicate the cumulative non-zero amount of data in the buffers of all logical channels of the user equipment; otherwise, the value indicate the amount of data available for transmission left in the buffer of the corresponding logical channel.

Figure 3B:
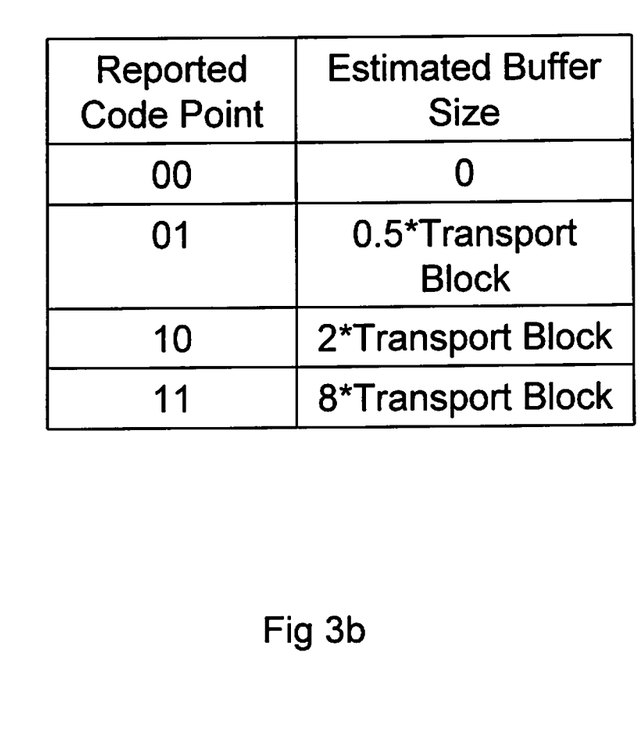

The MAC scheduler can estimate the amount of data available for transmission in the user equipment by multiplying the size of the TB with the factor associated to the code-point reported as shown in FIG. 3b.

Furthermore, the mapping table used by the user equipment is configurable by upper layers, i.e. by the RRC (Radio Resource Control) protocol.

Moreover, when a MAC sub-header, which corresponds to padding or to a MAC Control Element, is included in the MAC PDU, the MAC sub-header could be treated as the last MAC sub-header of the MAC PDU. In other words, when a MAC Control Element is present, the happy bits in a MAC sub-header associated to a MAC SDU reports a value that indicates the amount of data available for transmission left in the buffer of the logical channel indicated in the MAC sub-header.

Turning now to FIGS. 4-7, which show flowcharts illustrating embodiments of the present invention and schematically block diagrams of the arrangements according to embodiments of the present invention.

Figure 4:
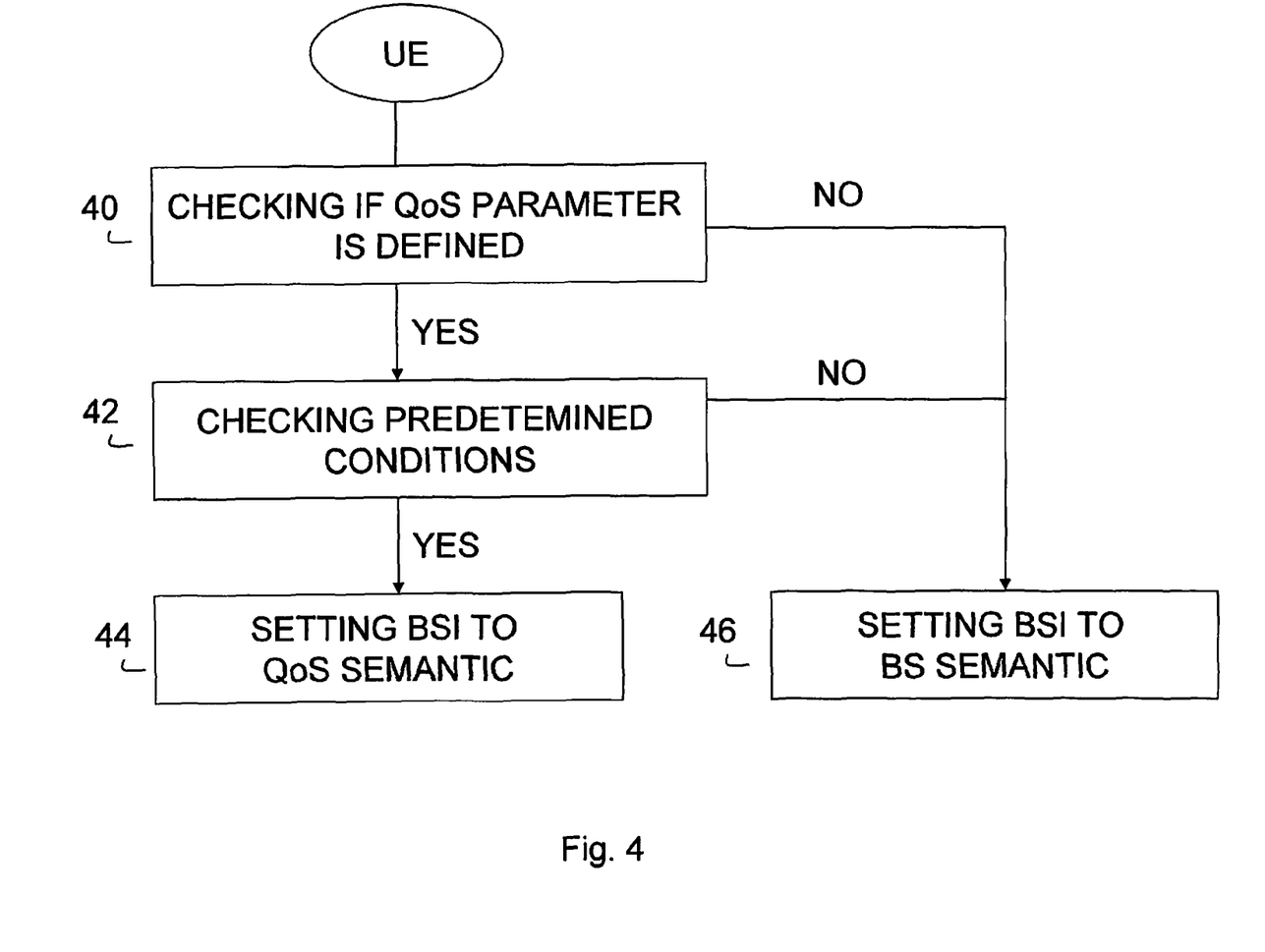
FIG. 4 is a flowchart illustrating an embodiment of the present invention.

A method for sending buffer status information in a transmission to a network node, e.g. an eNodeB, comprised in a mobile telecommunications network is provided as illustrated in the flowchart of FIG. 4. The method is implemented in a user equipment. The user equipment stores data available for transmission in a buffer associated with a logical channel group (LCG).

In a first step, the method checks if a QoS parameter is defined 40 for a logical channel (LC) comprised in the LCG. In a second step the method checks if at least one of a set of predetermined conditions 42 is fulfilled. The set of predetermined conditions may be
a) a buffer status report (BSR) of the LCG is included in the transmission,
b) the buffer status information for the LCG is succeeded by further buffer status information, and
c) the LCG is configured with the QoS based semantic.

Furthermore, if the QoS parameter is defined for the logical channel and at least one condition of the set of predetermined conditions is fulfilled, the method sets the buffer status information to the QoS-based semantic 44.

However, if the QoS parameter is not defined for the logical channel and/or none of the conditions of the set of predetermined conditions is fulfilled the buffer status information is set to the BS-based semantic 46.

Figure 5:
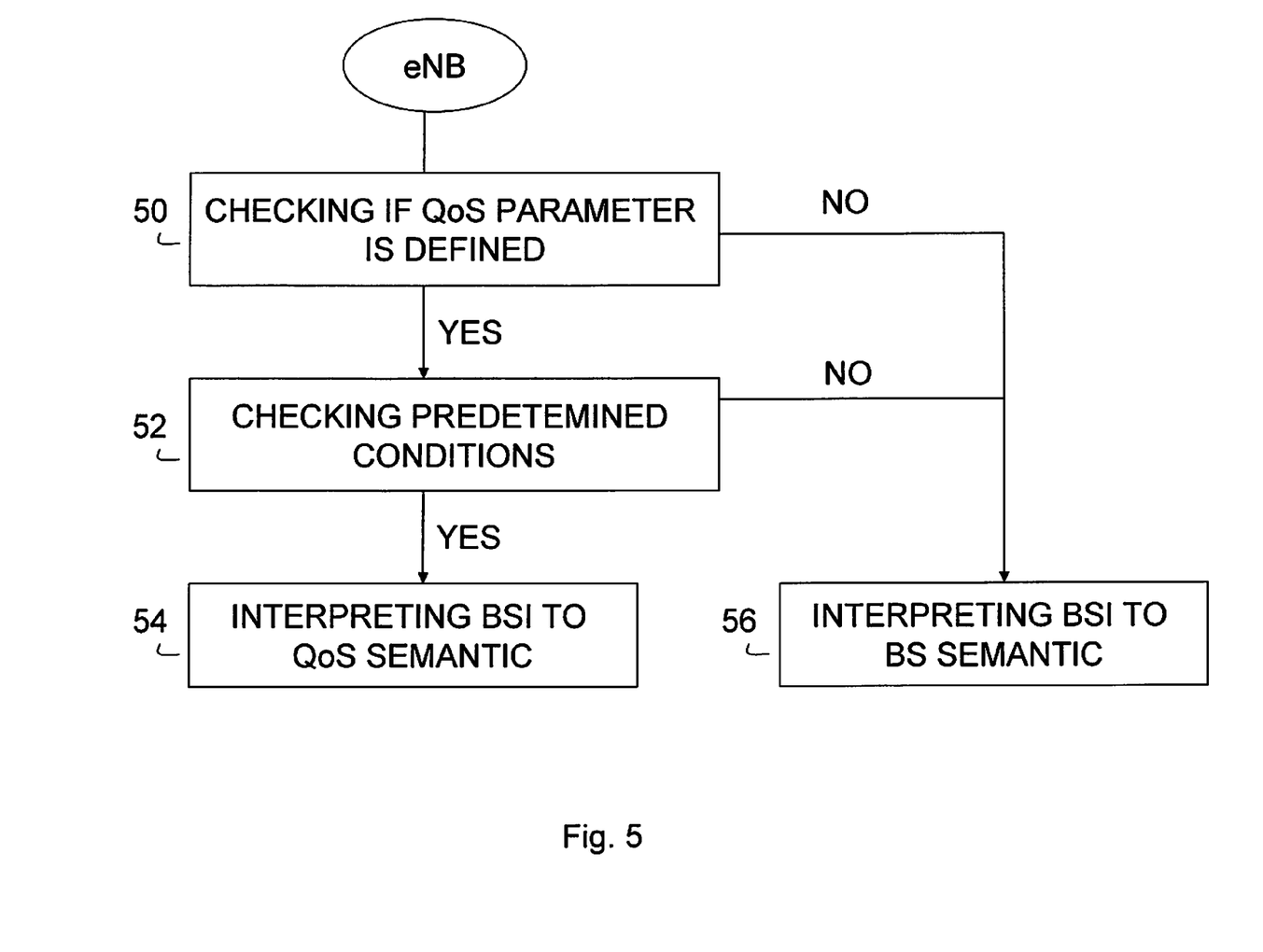
FIG. 5 is a flowchart illustrating an embodiment of the present invention.

Furthermore, the corresponding method for receiving buffer status information in a transmission from the user equipment, comprised in the mobile telecommunications network is provided as illustrated in the flowchart of FIG. 5. The method is implemented in a base station, e.g. an eNodeB. In a first step, the method checks if a QoS parameter is defined 50 for the LC comprised in the LCG. In a second step the method checks if at least one of the previously described set of predetermined conditions 52 is fulfilled. Furthermore, if the QoS parameter is defined for the logical channel and at least one condition of the set of predetermined conditions is fulfilled, the method interprets the buffer status information to the QoS-based semantic 54. However, if the QoS parameter is not defined for the logical channel and/or none of the conditions of the set of predetermined conditions is fulfilled the buffer status information is interpreted to the BS-based semantic 56.

It should be noted that the BS-based semantic could be based on the amount of data available for transmission across a plurality of logical channel groups in the user equipment. When the MAC sub-header corresponds to either a MAC Control Element or a padding, the BS-based semantic could in another embodiment be based on the amount of data available for transmission in the user equipment of one or a plurality of logical channel groups for which buffer status information has not been reported in the MAC PDU.

In addition, it should be mentioned that the QoS parameter could be a PBR parameter or a PDB parameter.

Figure 6:
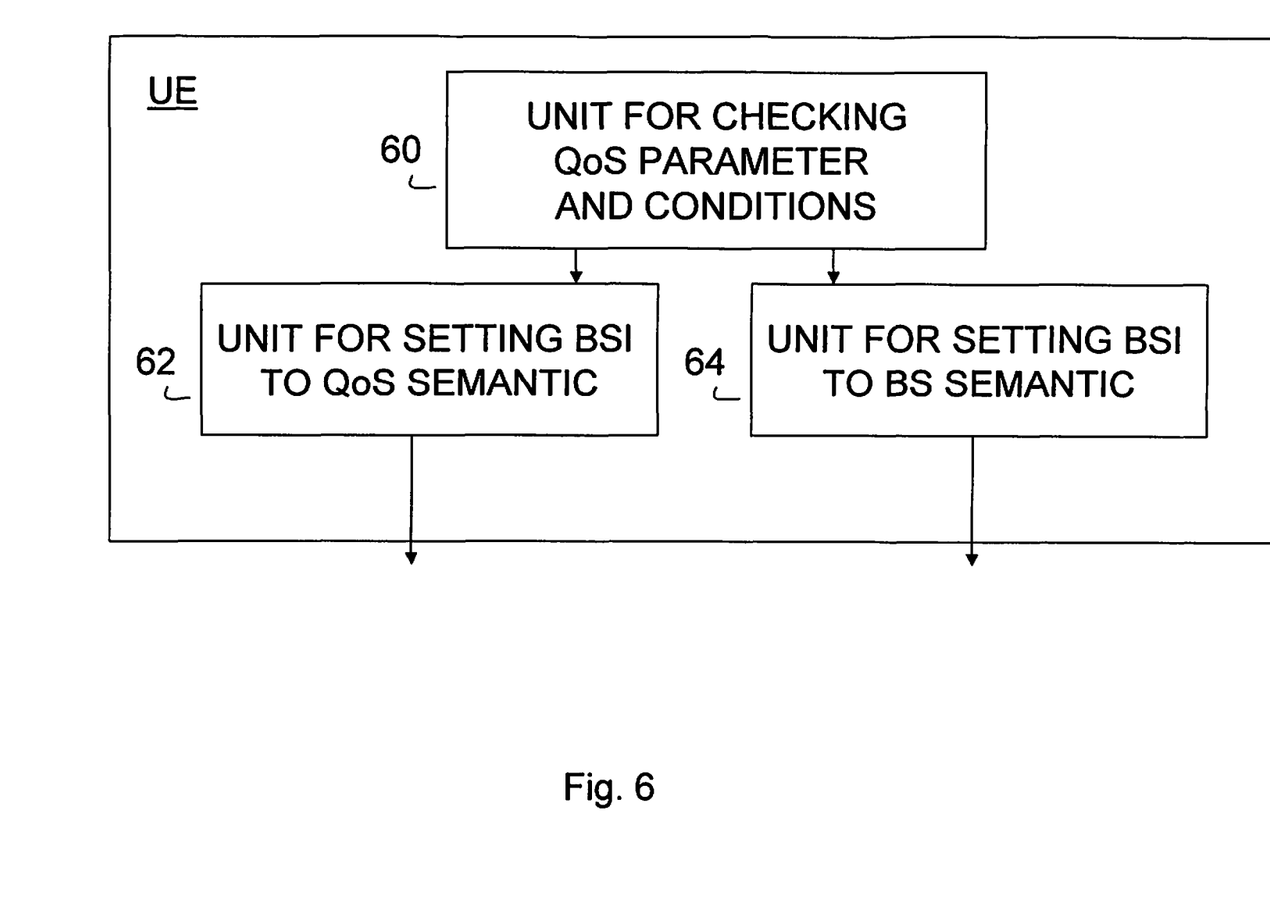
FIG. 6 shows a block diagram schematically illustrating an embodiment of the present invention.

The method shown in FIG. 4 may be implemented in an arrangement illustrated in FIG. 6. The arrangement comprises a unit 60 adapted for checking if a QoS parameter is defined for the logical channel and if a condition of the set of predetermined conditions is fulfilled. It further comprises a unit 62 adapted for setting the buffer status information associated with the LCG according to the QoS-based semantic. In addition, the arrangement comprises a unit 64 adapted for setting the buffer status information associated with the LCG according to the BS-based semantic.

Figure 7:
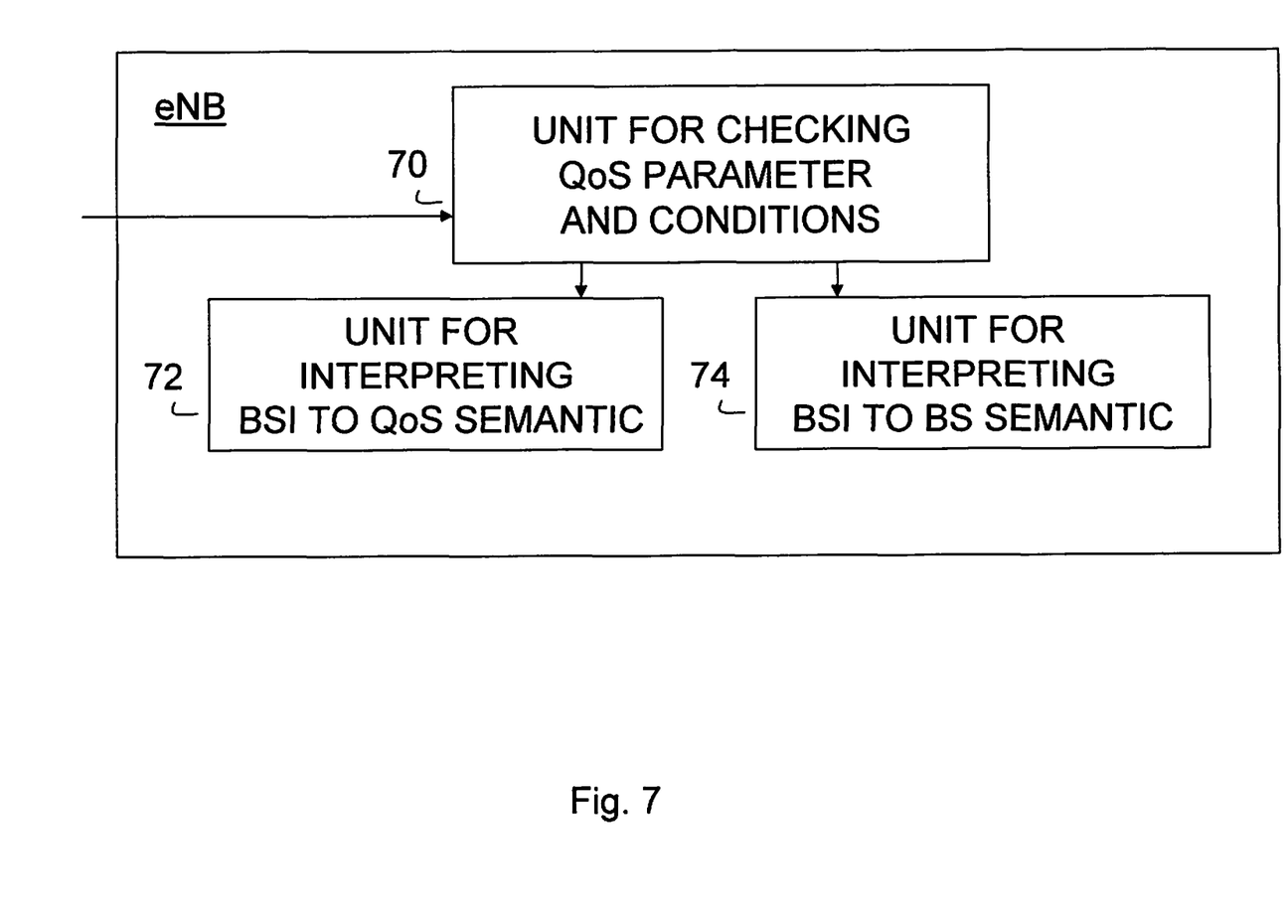
FIG. 7 shows a block diagram schematically illustrating an embodiment of the present invention.

The method shown in FIG. 5 may be implemented in an arrangement illustrated in FIG. 7. The arrangement comprises a unit 70 adapted for checking if a QoS parameter is defined for the logical channel and if a condition of the set of predetermined conditions is fulfilled. It further comprises a unit 72 adapted for interpreting the buffer status information associated with the LCG according to the QoS-based semantic. In addition, the arrangement comprises a unit 74 adapted for interpreting the buffer status information associated with the LCG according to the BS-based semantic.

Further embodiments also include combinations of one or more of the embodiments, as a whole or partly, described above.

While the present invention has been described with respect to particular embodiments (including certain device arrangements and certain orders of steps within various methods), those skilled in the art will recognize that the present invention is not limited to the specific embodiments described and illustrated herein. Therefore, it is to be understood that this disclosure is only illustrative. Accordingly, it is intended that the invention be limited only by the scope of the claims appended hereto.

The invention claimed is:

1. A method in a user equipment for sending buffer status information associated with a logical channel group comprising at least one logical channel, the method comprising:
   checking if a quality of service (QoS) parameter is defined for a first logical channel and at least one condition of a set of predetermined conditions associated with a logical channel group is fulfilled;
   if the QoS parameter is defined for the first logical channel and at least one condition of the set of predetermined conditions associated with the logical channel group is fulfilled, setting a number of bits in a media access control header of a transmission according to a first semantic, wherein the bits carry buffer status information associated with the logical channel group and the first semantic is based on the QoS parameter of the first logical channel; and
   otherwise, setting the number of bits carrying the buffer status information associated with the logical channel group according to a second semantic, wherein the second semantic is based on an amount of data available for transmission across the logical channel group in the user equipment.

2. The method of claim 1, wherein the set of predetermined conditions comprises:
   a) a buffer status report of the logical channel group is included in the transmission;
   b) the buffer status information for the logical channel group is succeeded by further buffer status information; and
   c) the logical channel group is configured with the first semantic.

3. The method of claim 1, wherein the second semantic is based on an amount of data available for transmission across a plurality of logical channel groups in the user equipment.

4. The method of claim 1, further comprising sending a Media Access Control (MAC) Protocol Data Unit (PDU) on a transport channel to a network node, and wherein the buffer status information is carried in at least one bit in a MAC sub-header of the MAC PDU.

5. The method of claim 4, wherein:
   the MAC sub-header is a last MAC sub-header in the MAC PDU; and
   setting the number of bits carrying the buffer status information according to the second semantic based on an amount of data available for transmission in the user equipment of a plurality of logical channel groups for which buffer status information has not been reported in the MAC PDU.

6. The method of claim 4, wherein, in response to determining that the MAC sub-header corresponds to at least one of a MAC Control Element and a padding, setting the number of bits carrying the buffer status information according to the second semantic based on an amount of data available for transmission in the user equipment of a logical channel for which buffer status information has not been reported in the MAC PDU.

7. A method in a base station for receiving buffer status information associated with a logical channel group comprising at least one logical channel, the method comprising:
   checking if a quality of service (QoS) parameter is defined for a first logical channel and at least one condition of a set of predetermined conditions associated with a logical channel group is fulfilled; and
   if the QoS parameter is defined for the first logical channel and at least one condition of the set of predetermined conditions associated with the logical channel group is fulfilled, interpreting a number of bits in a media access control header of a transmission according to a first semantic, wherein the bits carry buffer status information associated with the logical channel group and the first semantic is based on the QoS parameter of the first logical channel; and
   otherwise, interpreting the number of bits carrying the buffer status information associated with the logical channel group according to a second semantic, wherein the second semantic is based on an amount of data available for transmission across the logical channel group in a user equipment.

8. The method of claim 7, wherein the set of predetermined conditions comprises:
   a) a buffer status report of the logical channel group is included in the transmission;
   b) the buffer status information for the logical channel group is succeeded by further buffer status information; and
   c) the logical channel group is configured with the first semantic.

9. The method of claim 7, wherein the second semantic is based on the amount of data available for transmission across a plurality of logical channel groups in the user equipment.

10. The method of claim 7, further comprising receiving a Media Access Control (MAC) Protocol Data Unit (PDU) on a transport channel, and wherein the buffer status information is carried in at least one bit in a MAC sub-header of the MAC PDU.

11. The method of claim 10, wherein:
   the MAC sub-header is a last MAC sub-header in the MAC PDU; and
   interpreting the number of bits carrying the buffer status information according to the second semantic based on the amount of data available for transmission in the user equipment of a plurality of logical channel groups for which buffer status information has not been reported in the MAC PDU.

12. The method of claim 10, further comprising:
   determining whether the MAC sub-header corresponds to at least one of a MAC Control Element and a padding; and
   in response to determining that the MAC sub-header corresponds to at least one of a MAC Control Element and a padding, interpreting the number of bits carrying the buffer status information according to the second semantic based on an amount of data available for transmission in the user equipment of a logical channel for which buffer status information has not been reported in the MAC PDU.

13. An arrangement in a user equipment for sending buffer status information associated with a logical channel group comprising at least one logical channel, the arrangement comprising:
   a unit configured to check if a quality of service (QoS) parameter is defined for a first logical channel and at least one condition of a set of predetermined conditions associated with a logical channel group is fulfilled;
   a unit configured to set a number of bits in a media access control header of a transmission according to a first semantic if the QoS parameter is defined for the first logical channel and at least one condition of the set of predetermined conditions associated with the logical channel group is fulfilled, wherein the bits carry buffer status information associated with the logical channel group and the first semantic is based on the QoS parameter of the first logical channel; and a unit configured to set the number of bits carrying the buffer status information associated with the logical channel group according to a second semantic, if the QoS parameter is not defined for the first logical channel or at least one condition of the set of predetermined conditions associated with the logical channel group is not fulfilled, wherein the second semantic is based on an amount of data available for transmission across the logical channel group in the user equipment.

14. The arrangement of claim 13, wherein the set of predetermined conditions comprises:
   a) a buffer status report of the logical channel group is included in the transmission;
   b) the buffer status information for the logical channel group is succeeded by further buffer status information; and
   c) the logical channel group is configured with the first semantic.

15. The arrangement of claim 13, wherein the second semantic is based on an amount of data available for transmission across a plurality of logical channel groups in the user equipment.

16. The arrangement of claim 13, wherein the arrangement is configured to send a Media Access Control (MAC) Protocol Data Unit (PDU) on a transport channel to a network node, and wherein the buffer status information is carried in at least one bit in a MAC sub-header of the MAC PDU.

17. The arrangement of claim 16, wherein:
   the MAC sub-header is a last MAC sub-header in the MAC PDU; and
   the unit configured to set the number of bits carrying the buffer status information according to the second semantic is based on the amount of data available for transmission in the user equipment of a plurality of logical channel groups for which buffer status information has not been reported in the MAC PDU.

18. The arrangement of claim 16, wherein the unit is configured to set the number of bits carrying the buffer status information according to the second semantic if the MAC sub-header corresponds to at least one of a MAC Control Element and a padding, and wherein the second semantic is based on an amount of data available for transmission in the user equipment of a logical channel for which buffer status information has not been reported in the MAC PDU.

19. An arrangement in a base station for receiving buffer status information associated with a logical channel group comprising at least one logical channel, the arrangement comprising:
   a unit configured to check if a quality of service (QoS) parameter is defined for a first logical channel and at least one condition of a set of predetermined conditions associated with a logical channel group is fulfilled;
   a unit configured to interpret a number of bits in a media access control header of a transmission according to a first semantic if the QoS parameter is defined for the first logical channel and at least one condition of the set of predetermined conditions associated with the logical channel group is fulfilled, wherein the bits carry buffer status information associated the logical channel group and the first semantic is based on the QoS parameter of the first logical channel; and
   a unit configured to interpret the number of bits carrying the buffer status information associated with the logical channel group according to a second semantic, if the QoS parameter is not defined for the first logical channel or at least one condition of the set of predetermined conditions associated with the logical channel group is not fulfilled, wherein the second semantic is based on an amount of data available for transmission across the logical channel group in a user equipment.

20. The arrangement of claim 19, wherein the set of predetermined conditions comprises:
   a) a buffer status report of the logical channel group is included in the transmission;
   b) the buffer status information for the logical channel group is succeeded by further buffer status information; and
   c) the logical channel group is configured with the first semantic.

21. The arrangement of claim 19, wherein the second semantic is based on an amount of data available for transmission across a plurality of logical channel groups in the user equipment.

22. The arrangement of claim 19, wherein the arrangement is configured to receive a Media Access Control (MAC) Protocol Data Unit (PDU) on a transport channel, and wherein the buffer status information is carried in at least one bit in a MAC sub-header of the MAC PDU.

23. The arrangement of claim 22, wherein:
   the MAC sub-header is a last MAC sub-header in the MAC PDU; and
   the unit is configured to interpret the number of bits carrying the buffer status information according to the second semantic based on an amount of data available for transmission in the user equipment of a plurality of logical channel groups for which buffer status information has not been reported in the MAC PDU.

24. The arrangement of claim 22, wherein the unit is configured to interpret the number of bits carrying the buffer status information according to second semantic if the MAC sub-header corresponds to at least one of a MAC Control Element and a padding, and wherein the second semantic is based on the amount of data available for transmission in the user equipment of a logical channel for which buffer status information has not been reported in the MAC PDU.

* * * * *

UNITED STATES PATENT AND TRADEMARK OFFICE
CERTIFICATE OF CORRECTION

| | | |
|---|---|---|
| PATENT NO. | : 8,488,551 B2 | Page 1 of 1 |
| APPLICATION NO. | : 12/865605 | |
| DATED | : July 16, 2013 | |
| INVENTOR(S) | : Pelletier et al. | |

It is certified that error appears in the above-identified patent and that said Letters Patent is hereby corrected as shown below:

On the Title Page, in Item (57), under "ABSTRACT", in Column 2, Line 3, delete "the set" and insert -- a set --, therefor.

On the Title Page, in Item (57), under "ABSTRACT", in Column 2, Line 9, delete "semantic—is" and insert -- semantic is --, therefor.

On the Title Page, in the Figure, for Tag "42", in Line 1, delete "PREDETEMINED" and insert -- PREDETERMINED --, therefor.

In the Drawings

In Fig. 4, Sheet 4 of 7, for Tag "42", in Line 1, delete "PREDETEMINED" and insert -- PREDETERMINED --, therefor.

In Fig. 5, Sheet 5 of 7, for Tag "52", in Line 1, delete "PREDETEMINED" and insert -- PREDETERMINED --, therefor.

Signed and Sealed this
Eleventh Day of November, 2014

Michelle K. Lee
*Deputy Director of the United States Patent and Trademark Office*